(12) United States Patent
Chen et al.

(10) Patent No.: US 11,196,766 B2
(45) Date of Patent: Dec. 7, 2021

(54) DETECTING DENIAL OF SERVICE ATTACKS IN SERVERLESS COMPUTING

(71) Applicant: Red Hat, Inc., Raleigh, NC (US)

(72) Inventors: Huamin Chen, Westford, MA (US); Yehuda Sadeh-Weinraub, Los Angeles, CA (US)

(73) Assignee: Red Hat, Inc., Raleigh, NC (US)

( * ) Notice: Subject to any disclaimer, the term of this patent is extended or adjusted under 35 U.S.C. 154(b) by 309 days.

(21) Appl. No.: 16/360,129

(22) Filed: Mar. 21, 2019

(65) Prior Publication Data

US 2020/0304539 A1 Sep. 24, 2020

(51) Int. Cl.
H04L 29/06 (2006.01)
H04L 29/08 (2006.01)

(52) U.S. Cl.
CPC ...... H04L 63/1458 (2013.01); H04L 63/1416 (2013.01); H04L 67/1097 (2013.01)

(58) Field of Classification Search
CPC ...... G06F 13/00; G06F 21/552; G06F 21/554; G06F 21/565; G06F 2221/2119; H04L 29/06; H04L 29/08; H04L 63/101; H04L 63/145; H04L 63/168; H04L 63/227; H04L 63/1408; H04L 63/1416; H04L 63/1425; H04L 63/1441; H04L 63/1458; H04L 63/1483; H04L 67/00; H04L 67/02; H04L 67/20; H04L 67/26; H04L 67/1097
USPC ..................................................... 726/22, 23
See application file for complete search history.

(56) References Cited

U.S. PATENT DOCUMENTS

| | | | |
|---|---|---|---|
| 8,181,251 B2* | 5/2012 | Kennedy | H04L 63/145 726/23 |
| 8,954,581 B2 | 2/2015 | Robinson | |
| 9,141,789 B1* | 9/2015 | Gerlach | H04L 63/1416 |
| 9,413,783 B1* | 8/2016 | Keogh | H04L 63/0227 |
| 9,479,532 B1* | 10/2016 | Gerlach | H04L 63/1425 |
| 9,781,157 B1* | 10/2017 | Gerlach | H04L 63/0254 |
| 9,838,417 B1 | 12/2017 | Khalid et al. | |
| 2014/0215605 A1* | 7/2014 | Decime | H04L 63/1441 726/22 |

(Continued)

OTHER PUBLICATIONS

Given et al., "The Intelligent Monitoring System, Software Integration Platform", Special Technical Report, Apr. 12, 1993, 84 pages.

(Continued)

*Primary Examiner* — Robert B Harrell
(74) *Attorney, Agent, or Firm* — Womble Bond Dickinson (US) LLP (57) ABSTRACT

An object may be received by a serverless computing system, such as a distributed object storage system, to be processed using serverless functions of the distributed object storage system. The object includes object metadata indicating an attribute of the object. The content of the object, such as the object's header is analyzed and the attribute indicated in the object metadata is validated based on the content of the object. The object analysis is performed using one or more scripts at an object-based storage level of the distributed object storage. A validation event is published indicating a validation status of the attribute. Serverless computing functions of the distributed object storage system may determine whether to process the object based on the validation status indicated in the validation event.

20 Claims, 5 Drawing Sheets

(56) References Cited

U.S. PATENT DOCUMENTS

| | | | | |
|---|---|---|---|---|
| 2016/0191548 A1* | 6/2016 | Smith | .................. | G06F 21/565 |
| | | | | 726/23 |
| 2017/0257388 A1* | 9/2017 | Addepalli | ........... | H04L 63/1458 |
| 2017/0359368 A1* | 12/2017 | Hodgman | ........... | H04L 63/1441 |
| 2018/0048657 A1* | 2/2018 | Hittel | .................... | G06F 16/907 |
| 2018/0048658 A1* | 2/2018 | Hittel | .................... | G06F 21/552 |

OTHER PUBLICATIONS

Red Hat, "PubSub Sync Module—Ceph Documentation", Jan. 31, 2019, 6 pages.

* cited by examiner

DETECTING DENIAL OF SERVICE ATTACKS IN SERVERLESS COMPUTING

TECHNICAL FIELD

Aspects of the present disclosure relate to serverless computing, and more particularly, to detecting and preventing denial of service (DoS) attacks in serverless computing systems.

BACKGROUND

Serverless computing, often referred to as functions as a service (FaaS) is a cloud computing model in which the cloud provider dynamically manages the allocation of the cloud system's computing resources for computing functions. A serverless computing system allows a developer to deploy code on the system, while handing the scaling, capacity planning and maintenance operations of running the code and hiding such operations from the developer. The deployed code may respond to events that originate from anywhere, including outside the system and the system handles the scaling/provisioning of resources to allow the code to respond to such events. One example of a serverless computing system is a software-defined distributed object storage system.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, a serverless computing system allows a developer to deploy code on the system, while handing the scaling, capacity planning and maintenance operations involved with running the code and hiding such operations from the developer. The deployed code may respond to events that originate from anywhere, including outside the system and the system handles the scaling/provisioning of resources to allow the code to respond to such events. As serverless computing systems are event driven, they respond to events by invoking functions on demand. In addition, functions can be chained together with triggering events from outside the system. A trigger is a class of events, such as changes that are made to a database. Once a trigger is defined, a developer can create rules to determine which function(s) should be invoked when an event occurs. Because applications running on a serverless computing system are defined declaratively, the serverless computing system is responsible for providing the resources to respond to events.

However, such event/trigger processes pose certain security issues. One example is a denial of service (DoS) attack. In a DoS attack, an attacker may transmit bogus files having metadata indicating they are genuine, such as a bogus image file having a real image file suffix (e.g. jpeg) to the serverless computing system. The event (receiving the bogus files) triggers response functions that attempt to parse the bogus file as an image file and thus generates errors. As a result, computing resources associated with the response functions are wasted, often times on a large scale. DoS attacks are not limited to using false file suffixes and can have metadata indicating other false attributes such as object size, for example. Such DoS attacks are difficult to detect a priori and can result in the usage of significant compute and storage resources.

Aspects of the present disclosure address the above-noted and other deficiencies by using a processing logic to analyze incoming objects and detect DoS attacks. In some embodiments, the processing logic may receive an object to be processed using serverless functions of a distributed object storage, the object having object metadata indicating an attribute of the object. The processing logic may analyze content of the object and validate the attribute based on the content of the object, wherein the processing logic analyzes the content using one or more scripts at an object-based storage level of the distributed object storage. By performing the analysis at the object-based storage level, computational resources associated with serverless functions of the distributed object storage may be preserved. The processing logic may publish a validation event indicating a validation status of the attribute and determine whether to process the object using the serverless functions based on the validation status.

Figure 1A:
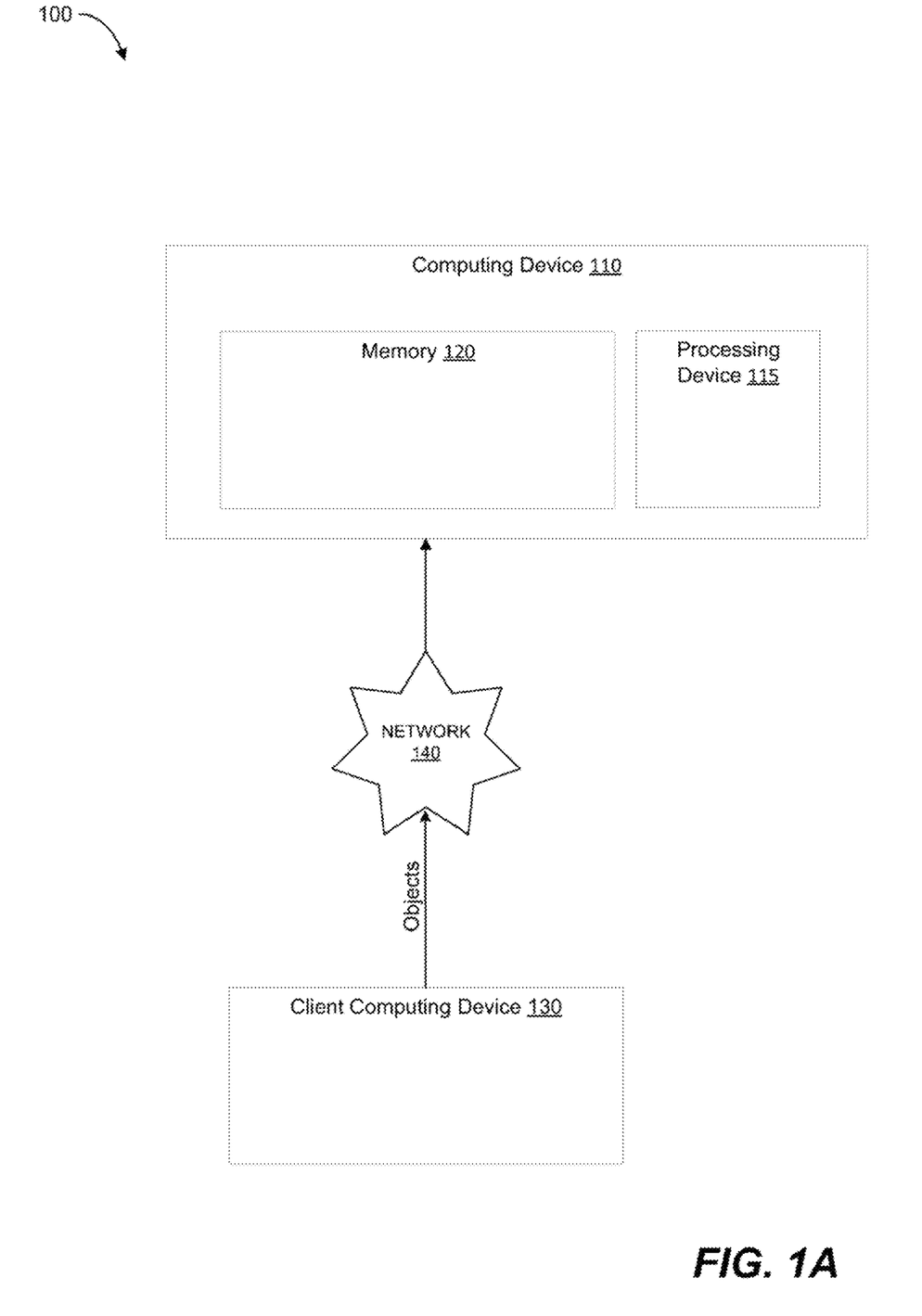
FIG. 1A is a block diagram that illustrates an example system, in accordance with some embodiments of the present disclosure.

FIG. 1A is a block diagram that illustrates an example serverless computing system 100, in accordance with some embodiments of the present disclosure. As illustrated in FIG. 1A, the system 100 includes computing device 110 and client computing device 130, and a network 140. The computing device 110 and the client computing device 130, may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 110 and the client computing device 130. In some embodiments, the computing device 110 may host a distributed object storage system.

Computing device 110 may include memory 120, which may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. In some embodiments, memory 120 may provide a serverless computing environment, such as a software-defined distributed data storage system comprising an object-based storage and a gateway software module as discussed in further detail with respect to FIG. 1B.

Each computing device may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices 110 and 130 may comprise any suitable type of computing device or machine that has a programmable processor including, for example, server computers, desktop computers, laptop computers, tablet computers, smartphones, set-top boxes, etc. In some examples, the computing devices 110 and 130 may comprise a single machine or may include multiple interconnected machines (e.g., multiple servers configured in a cluster). The computing device 110 and the client computing device 130 may be implemented by a common entity/organization or may be implemented by different entities/organizations. For example, computing device 110 may be operated by a first company/corporation and client computing device 130 may be operated by a second company/corporation. Each computing device 110 and 130 may execute or include an operating system (OS), as discussed in more detail below. The OS of a computing device 110 and 130 may manage the execution of other components (e.g., software, applications, etc.) and/or may manage access to the hardware (e.g., processors, memory, storage devices etc.) of the computing device. In some embodiments, computing devices 110 and 130 may be in a client/server relationship, with computing device 110 acting as a server and client computing device 130 acting as a client.

Figure 1B:
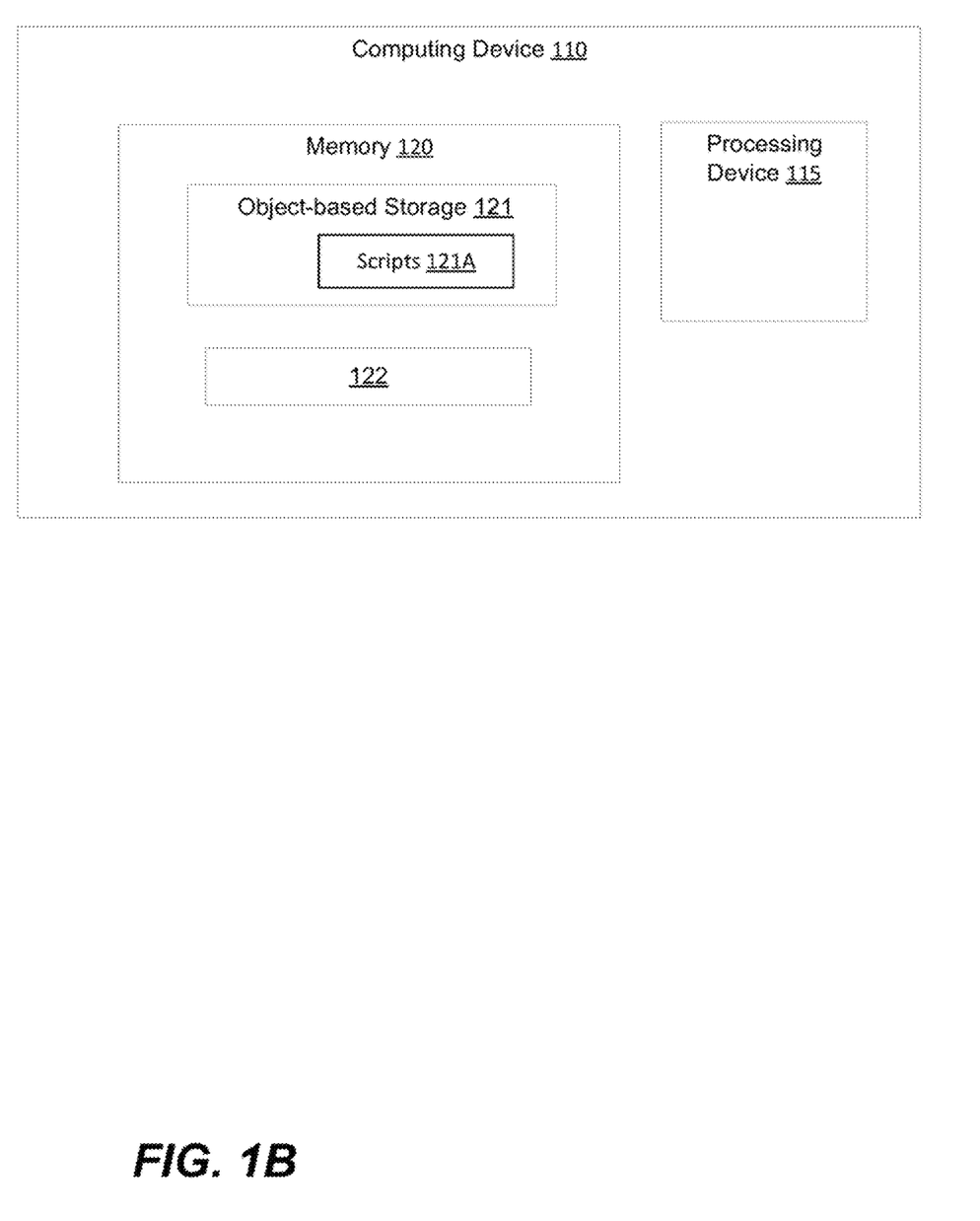
FIG. 1B is a block diagram that illustrates an example distributed object storage device, in accordance with some embodiments of the present disclosure.

FIG. 1B illustrates computing device 110 in accordance with some embodiments of the present disclosure. Computing device 110 may implement, using memory 120, a software-defined distributed storage system, such as Red Hat™ Ceph™. Memory 120 may include an object-based storage 121, such as reliable autonomic distributed object store (RADOS™), which provides a software-defined (e.g., as an abstraction) scalable storage service for variably sized objects. Memory 120 may also include gateway software module 122 that provides client applications with direct access to the object-based storage 121 while also providing a foundation for serverless functions as well as other subsystems of the software-defined storage system such as RADOS™ Block Device (RBD)™, RADOS™ Gateway™, and the Ceph™ File System. Gateway software module 122 may also provide an object storage interface that provides client applications with a RESTful gateway to the object based storage 121, such as RADOS™ Gateway™. The object storage interface may provide object storage functionality with an interface that is compatible with a large subset of the Amazon S3™ RESTful API. Alternatively, the object storage interface may provide object storage functionality with an interface that is compatible with a large subset of the OpenStack Swift™ API, or any other appropriate API. The object-based storage 121 and the gateway software module 122 may together be used to implement the software-defined distributed storage system. It should be noted that although illustrated on a single computing device 110 in FIG. 1B, in some embodiments the software-defined distributed storage system may be implemented across multiple computing devices (e.g. as a storage network) and gateway software module 122 may run across multiple computing devices.

The object-based storage 121 may provide an underlying distributed storage abstraction. The unit of storage in object-based storage 121 is an object. Each object has a name, which may comprise an identifier, a header, a number of named attributes (e.g., xattrs), and a variable-sized data payload (e.g., a file). Objects are stored in object pools and each pool has a name (e.g. "foo") and forms a distinct object namespace. Each pool also has a number of parameters that define how the object is stored, namely a replication level (2×, 3×, etc.) and a mapping rule describing how replicas should be distributed across the storage cluster (e.g., each replica in a separate rack). In some embodiments, pools may alternatively use erasure coding or any other appropriate method to store data. The storage cluster consists of some (potentially large) number of storage servers, or OSDs (object storage daemons/devices), and the combined cluster can store any number of pools. Each OSD may be supported by physical memory resources of memory 120. For example, memory 120 may comprise a number of hard disk drives (HDDs) and/or solid state drives (SSDs). Each OSD may be supported by one or more HDDs and/or SSDs of memory 120.

The OSDs of object-based storage 121 are able to operate with a relative autonomy when it comes to recovering from failures or migrating data in response to cluster expansion. By minimizing the role of a central cluster coordinator, the overall system is extremely scalable. A small system of a few nodes can seamlessly grow to hundreds or thousands of nodes (or contract again) as needed.

Object-based storage 121 may also include object analysis software module 121A, which may comprise a set of user defined scripts which may be executed to process objects while they are persisted in the object-based storage 121. The scripts may run in the input/output path of the OSD and may run in response to a trigger from the object storage interface. An object received and persisted in the object-based storage 121 may have object metadata indicating one or more attributes of the object (e.g., a file name suffix indicating a stated file type, or an indicator of the stated size of the object). Because it is unclear whether the object actually is of the type indicated in the object metadata, the type indicated therein is considered a stated type (or, stated differently, an alleged type). As discussed in more detail herein, the scripts may inspect the object, retrieve information about the object (e.g., type, size) based on the inspection, and update the metadata allocated to the object in the scripts (referred to as script metadata) based on the information retrieved. To retrieve information about the object, the scripts may analyze a content of the object, such as the header. For example, the scripts may analyze the header of the object to detect patterns in the object's header. The scripts may then determine whether the detected patterns correspond to the stated type of the object (i.e. the object's type as indicated by the object's filename suffix). More specifically, each type of object (e.g., JPEG, MP3) may have a fixed format and byte range for information in the header. For example, a JPEG object may have a header format that specifies the size of the image, the algorithm used to encode/compress the image and how the image may be rendered as well as the byte range within the header data that such information will occupy. All of this information together may be considered the pattern of header information corresponding to a JPEG file. Thus, the scripts may determine whether a received object having a filename suffix indicating that it is a JPEG has a pattern of information in its header corresponding to the size of the image, the algorithm used to encode/compress the image and how the image may be rendered in the specified byte range of the header. If the patterns correspond to the stated type of the object, this indicates that the object is actually of the type stated in its object metadata and the scripts may update the object's type in the script metadata allocated to the object to "matching." If the patterns do not correspond to the stated type of the object, the scripts may update the object's type in the script metadata allocated to the object to "unverified" (i.e. the detected type is not the same as the stated type). In some embodiments, upon receiving and persisting the object in the object-based storage 121, the scripts may set the type in the script metadata allocated to the object to "unknown" and apply a time stamp to the object indicating a threshold time at which the object's type may be set to "unverified." If a current time stamp reaches a value that is equal to or greater than the threshold time indicated in the object's time stamp before the scripts determine whether the patterns correspond to the stated type of the object, then the scripts may update the object's type in the script metadata allocated to the object to "unverified" and discontinue the process of trying to determine whether the patterns correspond to a stated type of the object. If the patterns do not correspond to the stated type of the object (i.e. script metadata allocated to the object indicates its type as "unverified"), then this is an indication that the object may be a DoS attack. By performing this analysis using scripts executing at the object-based storage level, computing resources associated with serverless functions provided by gateway software module 122 may be preserved.

In another example, an object received and persisted in the object-based storage 121 may have object metadata indicating a stated size of the object. The scripts may analyze content of the object, such as the header, and determine whether the size of the object corresponds to the size stated in its object metadata.

Gateway software module 122 may also provide a publishing mechanism, such as RADOS™ Gateway PubSub™, for publishing object store modification events to subscribers. The mechanism may provide a RESTful API to provide configuration and control interfaces for the publishing functionality. The mechanism may publish creation, deletion, modification and other similar types of events to subscribers. The mechanism may also publish a special event type called a validation event to subscribers which may indicate the validation status of one or more attributes of an object that is persisted by the object-based storage 121. Upon being called to process the object, the serverless functions provided by gateway software module 122 may be instructed to automatically examine the published validation event and determine whether to execute on the object or not based on the validation status as discussed herein. In some embodiments, a developer may use the validation event to determine whether to execute serverless functions provided by gateway software module 122 on the object. The mechanism may update the validation status of the validation event based on information retrieved from the script metadata allocated to the object in the scripts. For example, if the script metadata allocated to the object indicates that the object type is "unverified," then the mechanism may update the validation status to false, indicating that the stated type of the object does not correspond to its content and therefore there is a high risk that it is a DoS attack. Thus, the serverless functions should not process the object. If the script metadata allocated to the object indicates that the object type is "matching," then the mechanism may update the validation status to true, indicating that the stated type of the object does correspond to its content and therefore there is little risk that it is a DoS attack. Thus the serverless functions may safely process the object. As discussed above, the serverless functions provided by gateway software module 122 may be configured to automatically examine the published validation event and determine whether to execute on the object or not based on the validation status as discussed above. In this way, a developer does not need to provide any input and the serverless functions can detect DoS attacks on their own.

In addition, if the script metadata allocated to the object indicates that the object type is "unknown," in some embodiments the mechanism may not publish a validation event.

Figure 2:
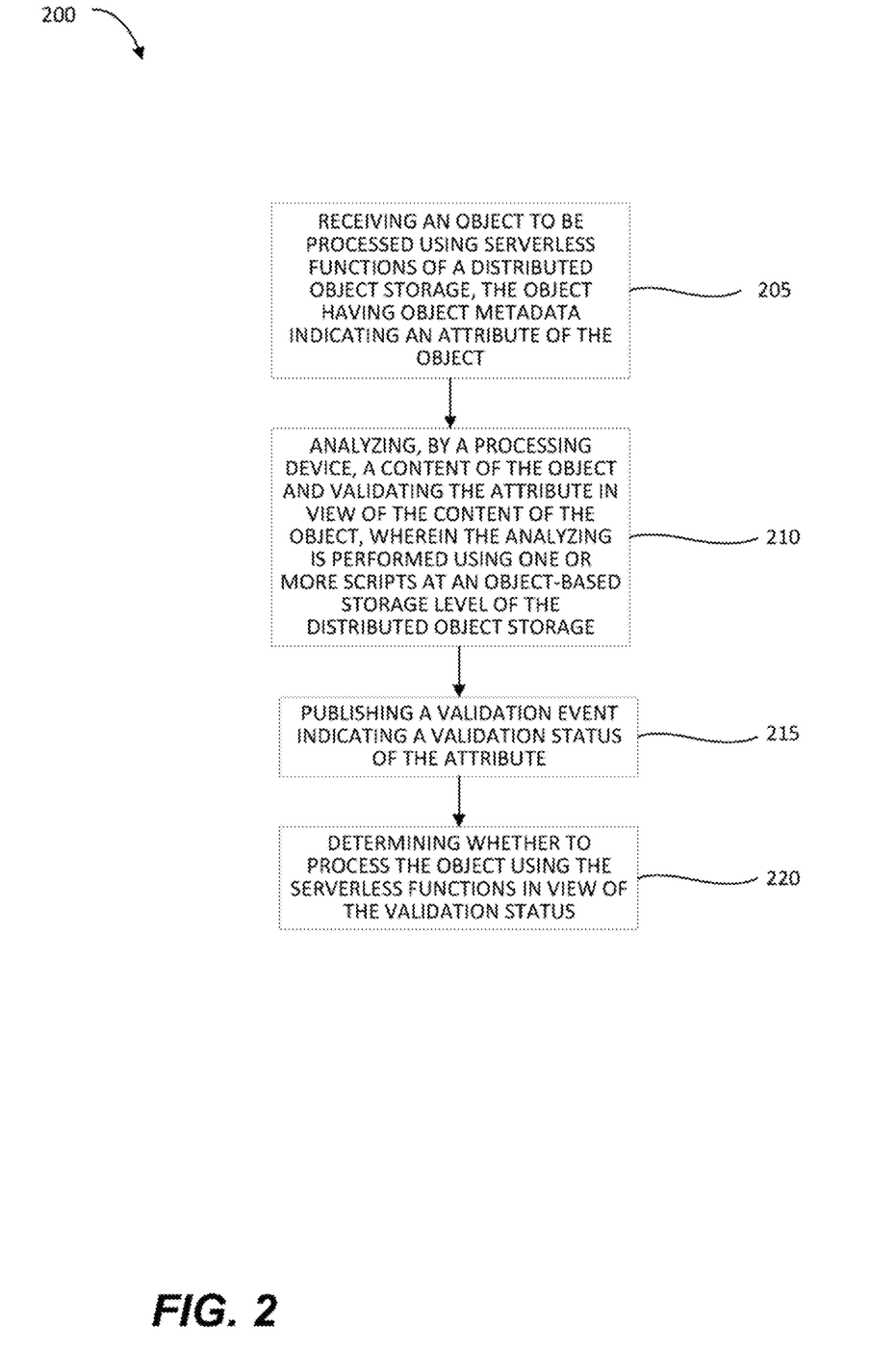
FIG. 2 is a flow diagram of a method of identifying potential DoS attacks, in accordance with some embodiments of the present disclosure.

FIG. 2 is a flow diagram illustrating a method 200 for detecting a DoS attack in a serverless computing system in accordance with some embodiments. Method 200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 200 may be performed by a computing device (e.g., computing device 110 illustrated in FIGS. 1A and 1B). Although discussed with respect to detecting a DoS attack based on filetype, it should be noted that the embodiments discussed herein may be used to detect DoS attacks based on object size, or any other appropriate parameter.

Referring to FIG. 2, at block 205 the processing logic may receive an object to be processed using serverless functions of a distributed object storage, the object having object metadata indicating an attribute of the object. The processing logic may persist the object in the object-based storage of the distributed object storage. The object may have object metadata indicating one or more attributes of the object (e.g., a file name suffix indicating a stated file type, an indicator of the stated size of the object). Because it is unclear whether the object actually is of the type indicated in the object metadata, the type indicated therein is considered a stated type (or, an alleged type). At block 210, the processing logic may analyze a content of the object and validate the attribute in view of the content of the object. More specifically, the processing logic may analyze a header of the object to detect patterns in the content of the header. In order to validate the attribute (in this case the stated type of the object), the processing logic may then determine whether the detected patterns correspond to the stated type of the object. The processing logic may perform the analysis and validation using one or more scripts executing at an object-based storage level of the distributed object storage. The one or more scripts may include their own metadata (script metadata) associated with the object and the processing logic may update the script metadata with the results of the analysis and validation as discussed in further detail below with respect to FIG. 3. Because the scripts are executed at the object-based storage level, computational resources associated with the serverless functions (provided by gateway software module 122) may be preserved.

Figure 3:
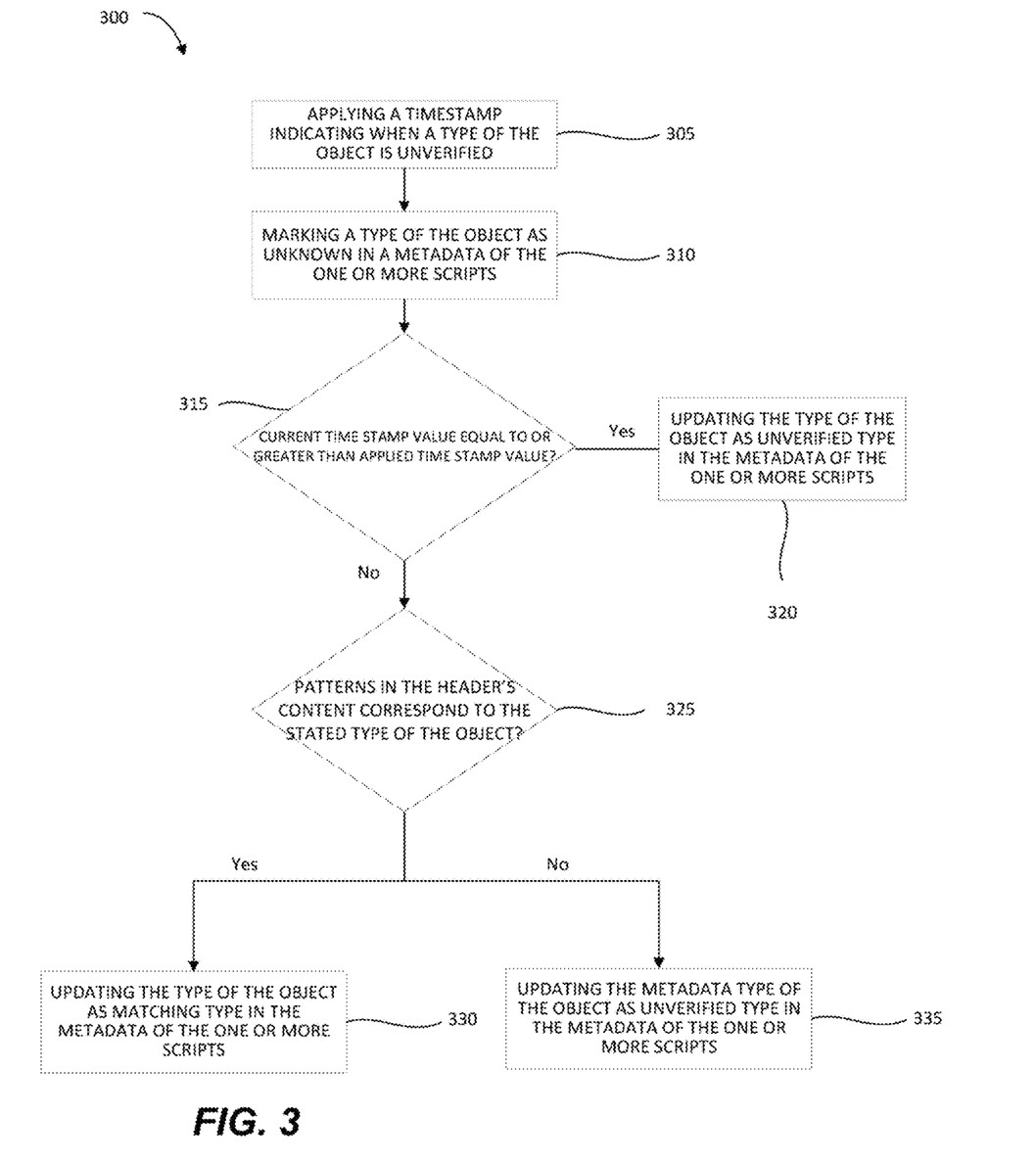
FIG. 3 is a flow diagram of a method of updating metadata of scripts executing at the object-based storage level based on the content of an object, in accordance with some embodiments of the present disclosure.

FIG. 3 is a flow diagram illustrating a method 300 for updating metadata of the one or more scripts (script metadata) with the results of the analysis and validation in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., computing device 110 illustrated in FIGS. 1A and 1B).

At block 305, the processing logic may, upon execution of the one or more scripts, apply a time stamp to the object indicating a threshold time at which the object's type may be set to "unverified" and at block 310 may initially assign the type of the object as "unknown" in the script metadata allocated to the object. At block 315, the processing logic may determine whether a current time stamp has equal or greater value than the threshold time indicated by the time stamp applied to the object. If the current time stamp value reaches a value that is equal to or greater than the time value indicated in the object's time stamp before the processing logic has determined whether the detected patterns correspond to the stated type of the object, processing logic may proceed to block 320 where it may change the type of the object to "unverified" type in the script metadata. In this case, the processing logic may discontinue the process of attempting to determine whether the detected patterns correspond to the stated type of the object. If the current time stamp value has not reached a value that is equal to or greater than the time value indicated in the object's time stamp, then at block 325 the processing logic may determine whether the detected patterns correspond to the stated type of the object. Responsive to the patterns in the content of the header corresponding to the stated type of the object, at block 330 the processing logic may update the type of the object as "matching" type in the metadata of the one or more scripts. Responsive to the patterns in the content of the header not corresponding to the stated type of the object, at block 335 the processing logic may update the metadata type of the object as "unverified" type in the metadata of the one or more scripts.

Referring back to FIG. 2, at block 215, the processing logic may publish a validation event indicating a validation status of the attribute. Processing logic may utilize a publishing mechanism (such as RADOS™ PubSub discussed above) and may publish creation, deletion, modification and other similar types of events to subscribers. The processing logic may also publish a special event type called a validation event to subscribers which may indicate the validation status of one or more attributes of the object, in this case the validation status of the stated type. The processing logic may retrieve the metadata of the one or more scripts allocated to the object and update the validation status of the validation event based on the type indicated by the metadata. For example, if the type indicated by the metadata of the one or more scripts is "matching," then processing logic may update the validation status to "true." A validation status of "true" indicates that the object is the type indicated in its object metadata (i.e. the stated type). If the type indicated by the metadata of the one or more scripts is "unverified," then processing logic may update the validation status to "false." A validation status of "false" indicates that the object is not the type indicated in its object metadata (i.e. the stated type) and may thus be a DoS attack. In some embodiments, if the type indicated by the retrieved script metadata is "unknown," the processing logic may not publish a validation event.

At block 220, the processing logic may determine whether to process the object using serverless functions (e.g., from gateway software module 122) based on the validation status of the published validation event. The serverless functions may be configured to automatically check the published validation event before processing the object. For example, if a serverless function is called, processing logic may examine the validation event and determine that the validation status is "false." In this case the processing logic may determine that the serverless function should not process the object as there is a high risk that it is a DoS attack. Alternatively, if the validation status is "true," then the processing logic may determine that it is safe to process the object as it is likely not a DoS attack. Although discussed with respect to stated file type, method 200 may be used to validate any appropriate stated attribute in a received object. For example, an object received and persisted in the object-based storage 121 may have object metadata indicating a stated size of the object. The processing logic may execute the object-based storage level scripts to analyze content of the object, such as the header, and determine whether the size of the object corresponds to the size stated in its object metadata in the same manner described above. The processing logic may then publish a validation event which may be used by the serverless functions (or a developer) to determine whether to process the object.

Figure 4:
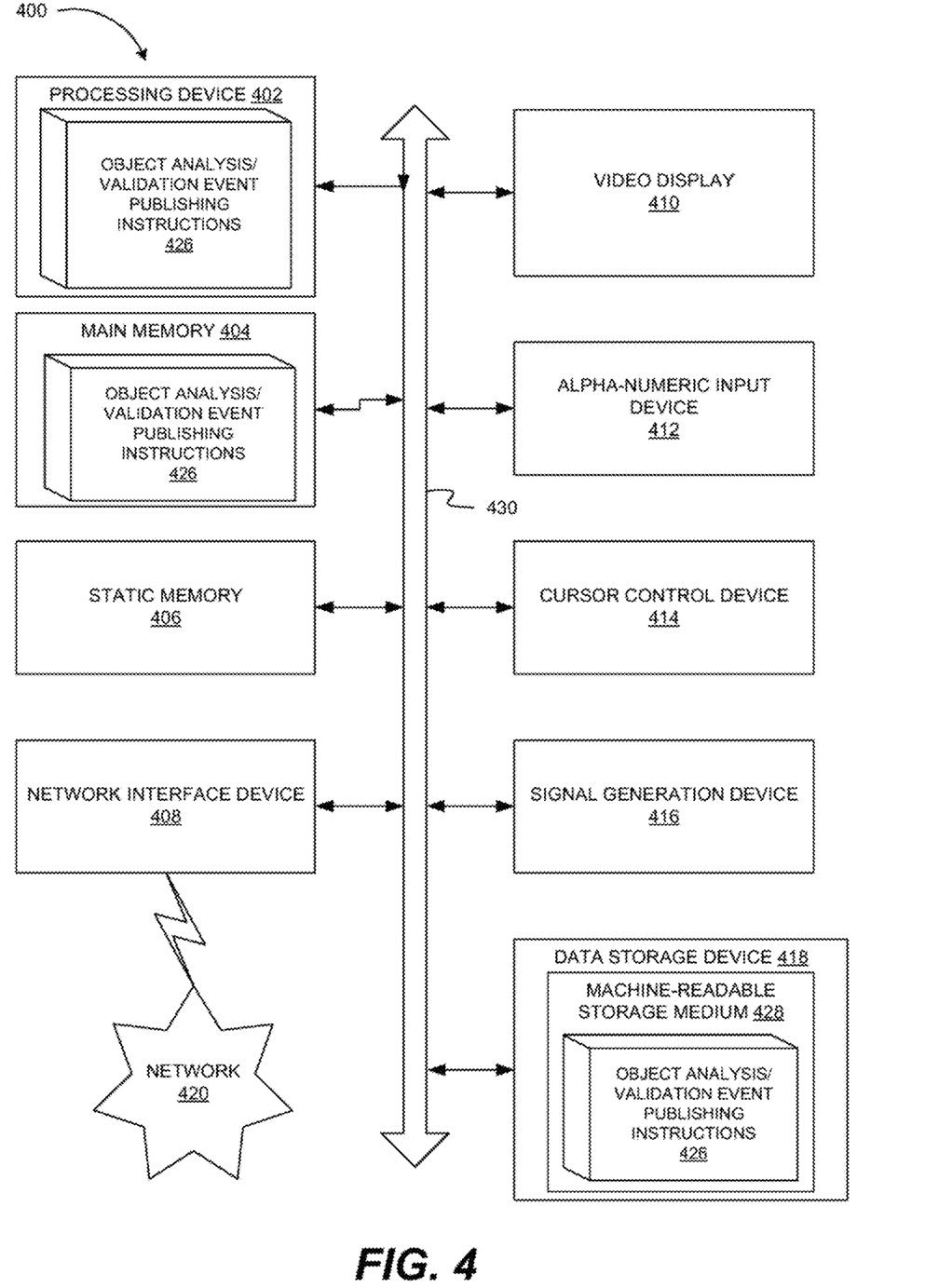
FIG. 4 is a block diagram that illustrates an example of a computing device in accordance with some aspects of the present disclosure.

FIG. 4 illustrates a diagrammatic representation of a machine in the example form of a computer system 400 within which a set of instructions, for causing the machine to perform any one or more of the methodologies discussed herein for detecting and preventing DoS attacks. More specifically, the machine may receive an object to be processed using serverless functions of a distributed object storage, the object having object metadata indicating an attribute of the object. The machine may analyze content of the object to validate the attribute based on the content of the object, and furthermore may perform such analysis using one or more scripts at an object-based storage level of the distributed object storage. The machine may publish a validation event indicating a validation status of the attribute and determine whether to process the object using the serverless functions based on the validation status.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 400 may be representative of a server, such as DSL server 110 configured to perform multi-level task debugging.

The exemplary computer system 400 includes a processing device 402, a main memory 404 (e.g., read-only memory (ROM), flash memory, dynamic random access memory (DRAM), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute object analysis/validation event publishing instructions 426, for performing the operations and steps discussed herein.

The data storage device 418 may include a machine-readable storage medium 428, on which is stored one or more sets of object analysis/validation event publishing instructions 426 (e.g., software) embodying any one or more of the methodologies of functions described herein, including instructions to cause the processing device 402 to execute scripts 121A shown in FIG. 1B. The object analysis/validation event publishing instructions 426 may also reside, completely or at least partially, within the main memory 404 or within the processing device 402 during execution thereof by the computer system 400; the main memory 404 and the processing device 402 also constituting machine-readable storage media. The instructions 422 may further be transmitted or received over a network 420 via the network interface device 408.

The machine-readable storage medium 428 may also be used to store instructions to perform a method for object analysis/validation event publishing, as described herein. While the machine-readable storage medium 428 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
    receiving an object to be processed using serverless functions of a distributed object storage, the object having object metadata indicating an attribute of the object;
    analyzing, by a processing device, a header of the object to detect a unique pattern among contents of the header, wherein the unique pattern corresponds to the attribute of the object;
    validating the attribute in view of the unique pattern, wherein the analyzing is performed using one or more scripts at an object-based storage level of the distributed object storage;
    publishing a validation event indicating a validation status of the attribute; and
    determining whether to process the object using the serverless functions in view of the validation status.

2. The method of claim 1, wherein the attribute is a stated type of the object.

3. The method of claim 2, wherein validating the attribute of the object comprises determining whether the unique pattern in the content of the header corresponds to the stated type of the object.

4. The method of claim 3, further comprising:
    applying a time stamp to the object indicating a threshold time value;
    marking a type of the object as unknown in a metadata of the one or more scripts;
    responsive to the unique pattern in the content of the header corresponding to the stated type of the object, updating the type of the object as matching type in the metadata of the one or more scripts;
    responsive to the unique pattern in the content of the header not corresponding to the stated type of the object, updating the metadata type of the object as unverified type in the metadata of the one or more scripts; and
    responsive to a current time stamp value reaching the threshold time value without determining whether the unique pattern in the content of the header corresponds to the stated type of the object, updating the type of the object as unverified type in the metadata of the one or more scripts.

5. The method of claim 4, wherein publishing the validation event comprises:
    updating the validation status as false when the type of the object is unverified; and
    updating the validation status as true when the type of the object is matching.

6. The method of claim 1, wherein analyzing the content of the header at the object-based storage level preserves computational resources associated with the serverless functions.

7. The method of claim 1, wherein the one or more scripts perform the analyzing asynchronously.

8. A system comprising:
    a memory;
    a processing device operatively coupled to the memory, the processing device to:
        receive, from a client computing device, an object to be processed using serverless functions of a distributed object storage, the object having object metadata indicating an attribute of the object;
        analyze, by the processing device, a header of the object to detect a unique pattern among contents of the header, wherein the unique pattern corresponds to the attribute of the object;
        validate the attribute in view of the unique pattern, wherein the analyzing is performed using one or more scripts at an object-based storage level of the distributed object storage;
        publish a validation event indicating a validation status of the attribute; and
        determine whether to process the object using the serverless functions in view of the validation status.

9. The system of claim 8, wherein the attribute is a stated type of the object.

10. The system of claim 9, wherein to validate the attribute, the processing device is to determine whether the unique pattern in the content of the header corresponds to the stated type of the object.

11. The system of claim 10, where the processing device is further to:
    apply a time stamp to the object indicating a threshold time value;
    mark a type of the object as unknown in a metadata of the one or more scripts;
    responsive to the unique pattern in the content of the header corresponding to the stated type of the object, update the type of the object as matching type in the metadata of the one or more scripts;
    responsive to the unique pattern in the content of the header not corresponding to the stated type of the object, update the metadata type of the object as unverified type in the metadata of the one or more scripts; and
    responsive to a current time stamp value reaching the threshold time value without determining whether the unique pattern in the content of the header correspond to the stated type of the object, update the type of the object as unverified type in the metadata of the one or more scripts.

12. The system of claim 11, wherein to publish the validation event, the processing device is to:
    update the validation status as false when the type of the object is unverified; and
    update the validation status as true when the type of the object is matching.

13. The system of claim 8, wherein by analyzing the content of the header at the object-based storage level, the processing device preserves computational resources associated with the serverless functions.

14. The system of claim 8, wherein the one or more scripts perform the analyzing asynchronously.

15. A non-transitory computer-readable storage medium including instructions that, when executed by a processing device, cause the processing device to:
    receive an object to be processed using serverless functions of a distributed object storage, the object having object metadata indicating an attribute of the object;

analyze, by the processing device, a header of the object to detect a unique pattern among contents of the header, wherein the unique pattern corresponds to the attribute of the object;

validate the attribute in view of the unique pattern, wherein the analyzing is performed using one or more scripts at an object-based storage level of the distributed object storage;

publish a validation event indicating a validation status of the attribute; and determine whether to process the object using the serverless functions in view of the validation status.

16. The non-transitory computer-readable storage medium of claim 15, wherein the attribute is a stated type of the object.

17. The non-transitory computer-readable storage medium of claim 16, wherein to validate the attribute, the processing device is to determine whether the unique pattern in the content of the header corresponds to the stated type of the object.

18. The non-transitory computer-readable storage medium of claim 17, where the processing device is further to:

apply a time stamp to the object indicating a threshold time value;

mark a type of the object as unknown in a metadata of the one or more scripts;

responsive to the unique pattern in the content of the header corresponding to the stated type of the object, update the type of the object as matching type in the metadata of the one or more scripts;

responsive to the unique pattern in the content of the header not corresponding to the stated type of the object, update the metadata type of the object as unverified type in the metadata of the one or more scripts; and responsive to a current time stamp value reaching the threshold time value without determining whether the unique pattern in the content of the header correspond to the stated type of the object, update the type of the object as unknown type in the metadata of the one or more scripts.

19. The non-transitory computer-readable storage medium of claim 18, wherein to publish the validation event, the processing device is to:

update the validation status as false when the type of the object is unverified; and update the validation status as true when the type of the object is matching.

20. The non-transitory computer-readable storage medium of claim 15, wherein by analyzing the header of the object at the object-based storage level, the processing device preserves computational resources associated with the serverless functions.

* * * * *